United States Patent [19]
Defraites, Jr.

[11] Patent Number: 5,908,040
[45] Date of Patent: *Jun. 1, 1999

[54] METHOD OF CLEANING BOATS THAT HAVE BEEN CONTAMINATED WITH OIL AND GAS WELL DRILLING FLUIDS AND HAZARDOUS WASTE

[76] Inventor: Arthur A. Defraites, Jr., 300 Buena Vista Blvd., Houma, La. 70360

[*] Notice: This patent is subject to a terminal disclaimer.

[21] Appl. No.: 08/842,244

[22] Filed: Apr. 23, 1997

Related U.S. Application Data

[63] Continuation-in-part of application No. 08/548,143, Oct. 25, 1995, Pat. No. 5,624,502.

[51] Int. Cl.$^6$ .................................................. B08B 7/04
[52] U.S. Cl. ............................. 134/10; 134/13; 210/805; 210/195.1
[58] Field of Search ........................ 134/10, 13; 210/805, 210/806, 194, 195.1, 721, 726, 765

[56] References Cited

U.S. PATENT DOCUMENTS

| | | |
|---|---|---|
| 3,920,550 | 11/1975 | Farrell, Jr. et al. . |
| 4,175,039 | 11/1979 | Fisher ........................................ 134/10 |
| 4,219,418 | 8/1980 | Pilon . |
| 4,221,661 | 9/1980 | Shimizu et al. . |
| 4,507,208 | 3/1985 | Simon et al. . |
| 4,834,889 | 5/1989 | Schleiffarth . |
| 5,051,191 | 9/1991 | Rasmussen et al. . |
| 5,114,578 | 5/1992 | Sundstrom . |
| 5,132,025 | 7/1992 | Hays . |
| 5,199,997 | 4/1993 | Stowe ....................................... 134/10 |
| 5,330,636 | 7/1994 | Reichert . |
| 5,374,352 | 12/1994 | Pattee . |

OTHER PUBLICATIONS

*World's Oil 1994*, Jun., 1994.

*Primary Examiner*—Jeffrey Snay
*Attorney, Agent, or Firm*—Garvey, Smith, Nehrbass & Doody, L.L.C.

[57] ABSTRACT

A system for cleaning vessels that have been contaminated with oil field drilling and production waste materials such as oil well drilling fluid or hazardous waste using recycled wash water. As dirty wash water accumulates in a vessel during cleaning, it is transferred to a settlement section of the waste receiving barge. A cationic polymer is injected into the suction side of a waste water pump during transfer of dirty fluid from the vessel to the receiving barge. The polymers react with fluids to begin an initial settling process within the waste receiving barge. Decant water is subjected to secondary settlement and secondary chemical treatment after it leaves the primary settling section of the waste receiving barge. The laundered water is returned to the wash water storage facility for reusing and cleaning the same vessel or additional vessels. In this fashion, waste is continuously concentrated in the receiving vessel for ultimate disposal at a remote site and wash water is recycled for reuse.

12 Claims, 4 Drawing Sheets

METHOD OF CLEANING BOATS THAT HAVE BEEN CONTAMINATED WITH OIL AND GAS WELL DRILLING FLUIDS AND HAZARDOUS WASTE

CROSS-REFERENCE TO RELATED APPLICATIONS

This is a continuation-in-part of U.S. patent application Ser. No. 08/548,143, filed Oct. 25, 1995, now U.S. Pat. No. 5,624,502, issued Apr. 29, 1997, which is incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to the cleaning of boat tanks, bilges, and holds; barges; mobile or land based tanks; cutting boxes or container; and related vessels (sometimes hereinafter referred to as "vessels") that have been contaminated with oil and gas well drilling fluids such as oil well drilling mud and the like or with hazardous waste. More particularly, the present invention relates to a method and apparatus for the cleaning (in a marine and land based environment) of vessels that have been contaminated with oil and gas well drilling fluids, wherein a recycling water recovery system reuses the same wash water over and over, while continuously concentrating solid material in a receiving barge after the wash water leaves the vessel being cleaned and carrying oil and gas well drilling fluid waste products therewith (including solid material), and wherein various treatment stations remove solid material, oil, and like pollutants from the wash water stream before it is recycled to clean the vessel a second time or to clean a second vessel or a third vessel, etc.

2. General Background of the Invention

In the drilling of oil and gas wells, there are a number of fluids that are used in the drilling process. These fluids include for example drilling mud that contains heavy solids. This drilling mud becomes a pollutant when it is placed in a vessel that is used to transport drilling mud from land to oil and gas well and drilling production platforms located offshore.

Other oil and gas well drilling, completion and work over fluids include non-dispersed dispersed drilling mud, dispersed drilling mud, calcium treated drilling mud, drilling mud incorporating polymers, drilling muds prepared from fresh or brine water and sodium chloride, oil-based drilling mud and synthetic drilling mud. Other fluids used in the drilling of oil and gas wells include bactericides, calcium removers, corrosion inhibitors, defoamers, emulsifiers, filtrate reducers, flocculants, foaming agents, lost circulation materials, lubricants, pipe-freeing agents, shale control inhibitors, and surface active agents. A discussion of the various types of drilling, completion and workover fluids used in the oil and gas well drilling industry can be seen in the June 1994 issue of "World Oil".

Additionally, drilling fluids not used downhole in the drilling process or discarded hydrocarbon based waste fluids that have to be transported back to land are considered hazardous waste as defined by the United States Environmental Protection Agency.

The present method of cleaning such oil and gas well drilling fluids and hazardous waste from vessels is to simply wash the vessel while capturing the wash water in a barge. The wash water becomes contaminated with the oil and gas well drilling fluids and hazardous waste. The barge must then be shipped to a disposal site wherein the contaminated wash water is disposed of.

The disposal of a barge filled with wash water from such a vessel cleaning operation is an expensive and time consuming procedure. Each barge contains thousands of gallons of contaminated wash water and may have to be transported with a tug vessel to a disposal site.

BRIEF SUMMARY OF THE INVENTION

The present invention solves these problems and short comings of the prior art by using the barge that typically collects all of the waste water as a vessel for concentrating solid material in a recycling process that allows the wash water to be used again and again. With the method of the present invention, various treatment stations remove solid material and oil from the wash water stream after a vessel has been cleaned. Indeed, with the method of the present invention the receiving barge that functions as the first station of the treatment process will eventually be shipped to a disposal site.

Treatment stations that are positioned down stream of the receiving barge also treat the wash water before it can be recycled for cleaning a vessel. At each of these stations, any waste material or hazardous waste that is removed from the wash water stream is transmitted to the receiving barge, again concentrating waste material for eventual disposal.

With the method of the present invention, multiple of the treatment stations can be land based and connected via pipe lines or like flow lines with the receiving barge which is typically floating adjacent the vessel to be cleaned. Further, the wash water storage facility is preferably land based although it could also be a barge or a barge mounted tank. This wash water storage facility contains an initial volume of wash water that is to be used in the cleaning of boats and receives treated wash water after it has been transmitted from the vessel to be cleaned to the receiving barge and then to the various treatment stations down stream of the treatment stations.

The method of the present invention thus provides an improved method and apparatus for cleaning vessels and the like that have been contaminated with oil and gas well drilling fluids such as drilling mud and hazardous waste.

The present invention first provides a laundered wash water storage facility for containing water to be used in cleaning of the boats. The boat is then cleaned with wash water from the storage facility. After the boat has been cleaned, contaminated wash water is then transmitted from the boat to a receiving barge that is floating adjacent the vessel to be cleaned. When wash water is transmitted from the vessel to be cleaned to the receiving barge, a cationic polymer is introduced into the wash water in a fluid line that extends between the vessel and the receiving barge.

Some solid material is settled and concentrated within the receiving barge. Supernatant wash water is decanted from the water surface area of the receiving vessel after the settling of some solid material within the receiving barge.

A cationic flocculent is introduced into the decant supernatant wash water in a flow line that extends between the receiving barge and a settling tank positioned downstream of the vessel and the receiving barge.

Additional solid material is removed from the wash water in a secondary settling tank. The solid material collected within the settling tank is transmitted to the receiving barge to further concentrate the solid material contained within the receiving vessel.

Wash water is transmitted from the settling tank to an aeration tank wherein the wash water is aerated to oxidize waste material contained within the wash water.

The wash water is then returned to the original water storage facility, by transmitting the now laundered wash water from the aeration tank to the water storage facility.

This laundered, recycled wash water can again be used to clean a vessel (i.e. the same vessel or a another vessel) that is contaminated with oil and gas well drilling fluids or hazardous waste.

By using the method of the present invention, the receiving barge can be used to continuously concentrate the true waste material i.e. solids and oil and gas well drilling fluid waste product in the receiving barge for disposal. The method of the present invention eliminates the problem of "bulk" contaminated wash water being necessarily transported via barge for disposal at a remote site. Thus, with the present invention, many vessels can be washed using the same receiving barge for accumulating and concentrating waste material.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
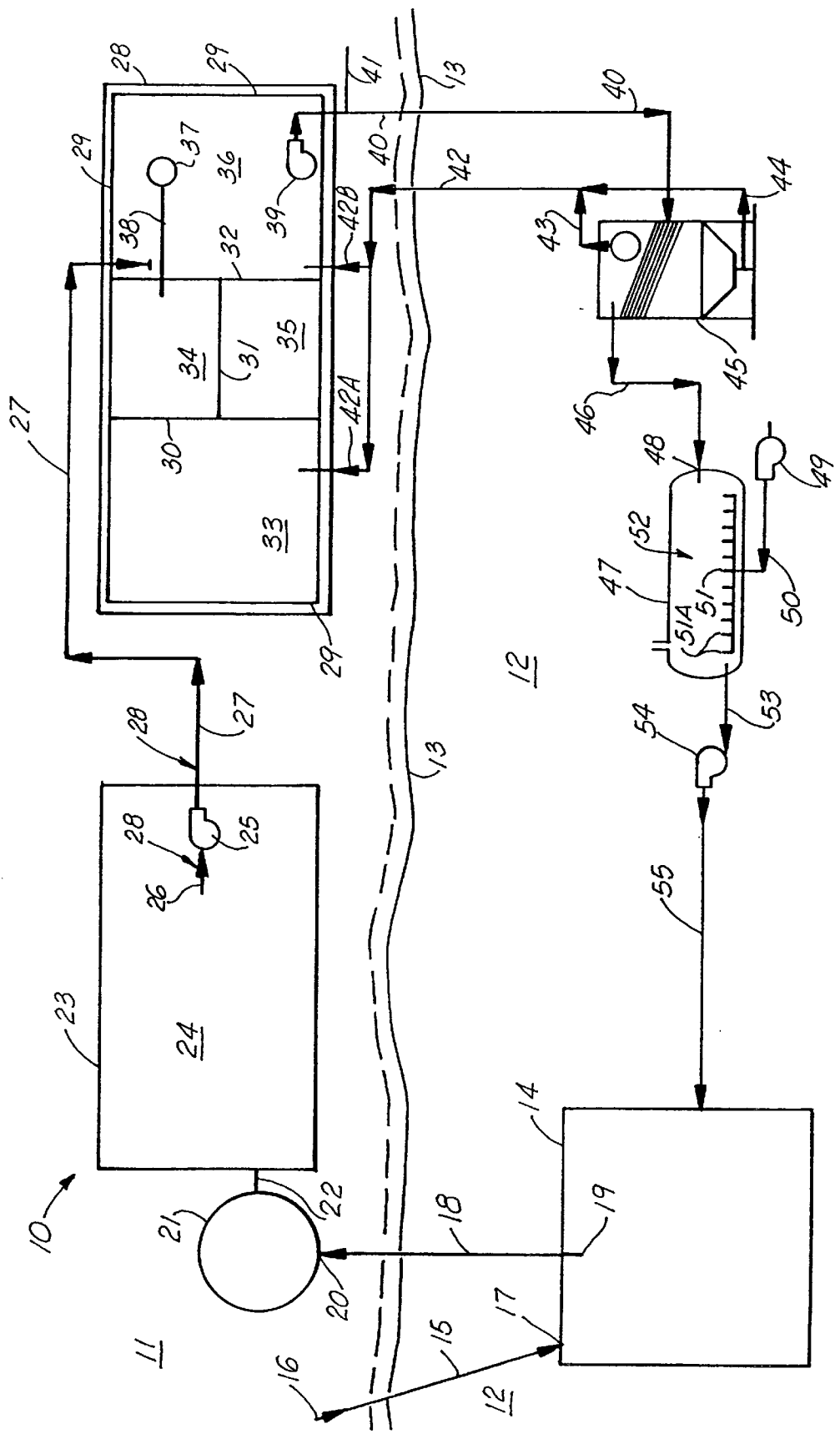
FIG. 1 is a plan view of the preferred embodiment of the apparatus of the present invention.

FIG. 1 illustrates in plan view the preferred embodiment of the apparatus of the present invention designated generally by the numeral 10. FIG. 1 also illustrates the method of the present invention that is used to treat wash water to be used to clean a vessel or a plurality of boats, barges, or like vessels. In FIG. 1, the body of water 11 is shown having a shoreline 13 separating the body of water 11 from land 12. In this environment, the wash water storage facility 14 can be located on land 12 adjacent shoreline 13. In this fashion, a vessel 23 to be cleaned, can be positioned at the shoreline 13 or on the land 12 and at close proximity to the wash water storage facility 14.

A flowline 15 extends from wash water storage facility 14 to the body of water 11. Flowline 15 has an intake 16 and a discharge 17. The flowline 15 can be used to replenish the wash water storage facility as needed to maintain a desired volume of water. The flowline 15 can intake make up water to compensate for any water that remains in the receiving barge in the cleaning operation or to enhance the wash water through dilution.

A flowline 18 extends from wash water storage facility 14 to pumping station 21. The flowline 18 has an intake 19 and a discharge 20. Pumping station 21 communicates with the vessel 23 to be cleaned using discharge line 22. The discharge line 22 can for example be a pipe or flexible hose having a nozzle or other cleaning head for cleaning. An oil field vessel carries drilling fluids or hazardous waste and the deck area 24 is often contaminated with such oil and gas well drilling fluids such as drilling mud or hazardous waste for example.

A pump 25 is used to transmit contaminated wash water from vessel 23 to receiving vessel such as barge 28. Pump 25 has a suction line 26 for intaking water that has been contaminated. The pump 25 is connected to a discharge line 27 for transmitting contaminated water from pump 25 to section 36 of receiving barge 28. The water recovery and treatment process of the present invention begins with a collection of the wash water that is introduced into receiving barge 28 using pump 25 and discharge line 27.

This contaminated wash water has been used on vessel 23 to clean and wash down any boat tanks, holds, bilges, barges, cutting boxes or containers, and any related waste contaminated portion of the vessel. The vessel 23 can be a boat, barge, work boat, crew boat, mobile or land based tanks, cutting boxes, containers or the like. Such vessels are known in the art for transporting drilling products between shore and offshore oil and gas well drilling platforms and production platforms.

As the contaminated wash water accumulates in the vessel 23 being cleaned, it is transferred via lines 26, 27 to a settlement section 36 of the waste water receiving barge 28 using pump 25.

A primary coagulation cationic polymer is injected into the suction side of the waste water pump 25. However, the primary coagulation cationic polymer can be discharged to the downstream or discharge side of the waste water pump 25 if desired. In FIG. 1, arrow 28 designates an introduction of a primary coagulation cationic polymer into the flowlines 26, 27 that are used to transmit contaminated water from vessel 23 to receiving barge 28.

The receiving barge 28 includes an outer vessel wall 29 and a plurality of inner walls 30–32. As shown in FIG. 1, the inner walls 30–32 divide the barge interior into a plurality of self-contained compartments 33–36. The compartment 36 defines a primary settling zone or settlement section for removing solid material that is contained in the contaminated wash water transmitted from vessel 23 to receiving barge 28 via flowline 27.

One of the advantages of the system of the present invention is that the receiving barge 28 continuously accumulates and concentrates solid waste material and floating waste material such as oil. With the method of the present invention, this is accomplished by continuously decanting only the uppermost water surface area of clean water contained in the receiving barge 28 and transmitting that decant water downstream for further treatment. Any oil or other floating waste is transmitted from section 36 of receiving barge 28 to one of the other sections 33–35 using skimmer 37 and its discharge line 38. The remaining solid material that is settled in settlement section 36 remains in that section 36 or can be transferred to one of the other sections 33–35 depending upon how much solid material has already been accumulated in the sections 33–35. Ideally, each of the sections 33–36 will be completely filled with solid or floating waste material using method of the present invention. The user continuously balances the amount of solid and floating waste material in each section 33–36 until the receiving barge is completely filled. Pump 39 skims only the very uppermost water layer contained in this section 36. Supernatant water or decant water is removed using pump 39 and pumped to treatment vessel 45. Water leaving receiving barge 28 section 36 is pumped via pump 39 and flowline 40 to settling tank 45.

In FIG. 1, the flowline 41 indicates a second point of chemical injection, namely the injection of a cationic flocculent. The pump 39 preferably has a floating suction pickup that is placed at an approximate depth of about six to twelve inches (6"–12") into the uppermost decant zone of section 36.

A cationic flocculent is injected at flowline 41 into the suction side of the transfer line which begins the secondary phase of the settling process. Oil slimmer 37 is used in the settlement section 36 of waste receiving barge 28 to collect any floating free product or emulsified oil that rises to the surface. These floating waste products are transferred to one of the waste concentration segments 33–35 of receiving barge 28.

Figure 2:
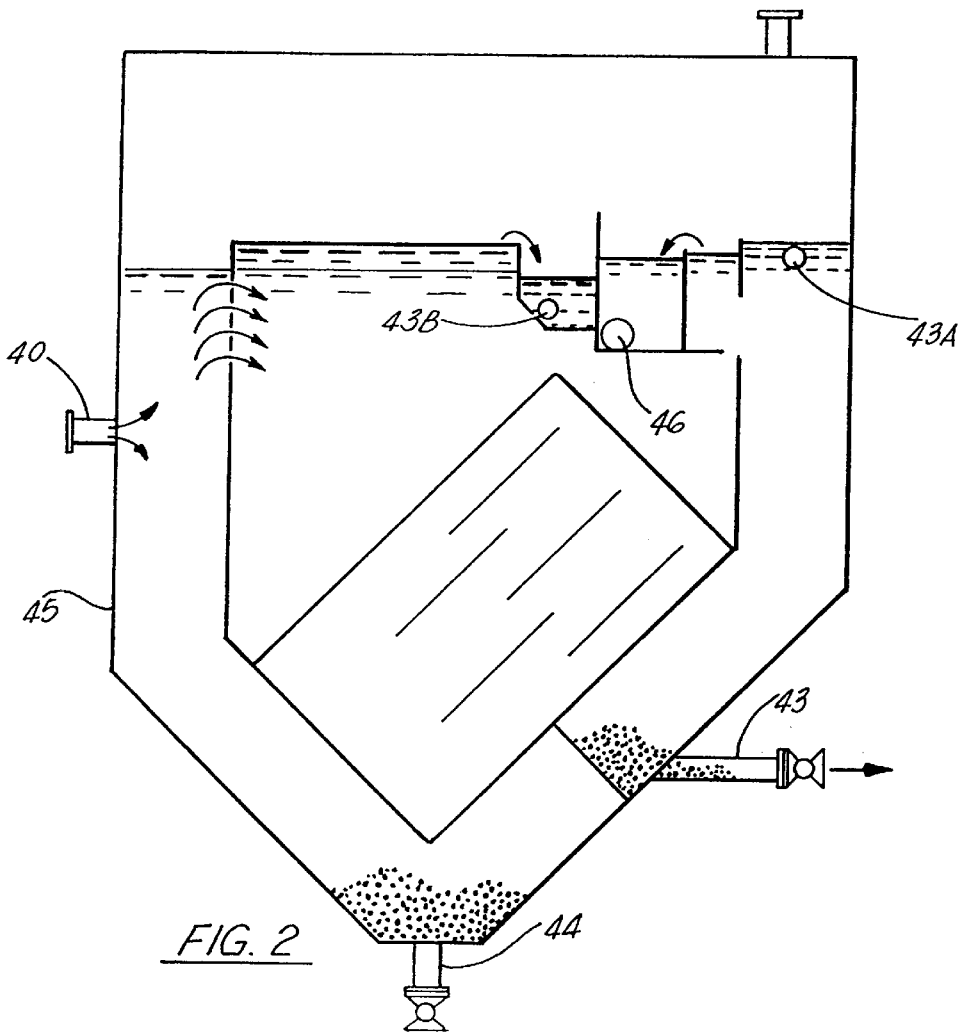
FIG. 2 is an elevational view illustrating the settling tank portion of the preferred embodiment of the apparatus of the present invention.
Figure 3:
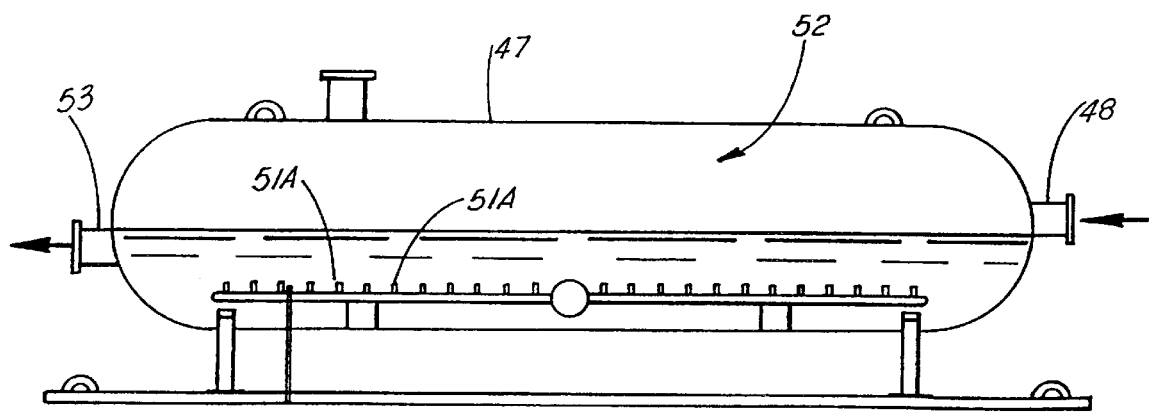
FIG. 3 is an elevational view of the aeration tank portion of the preferred embodiment of the apparatus of the present invention.

Settling tank 45 (see FIGS. 1 and 2) provides a pair of discharge lines 43, 44 for transporting floating and settleable solid waste material respectively from the settling tank 45 to the sections receiving barge 33–36. Line 43 can have more than one intake as shown in FIG. 2 wherein two intakes 43A–43B are shown. Flowline 42 can for example have multiple discharges 42A–42B for example via line 43 in order to distribute solid material via line 44 or floating waste material to the desired section 33–36 of receiving barge 28 as desired. An inclined plate settling tank such as 45 are commercially available for separating a waste water stream into the three components of settleable solids, floating solids, and clarified water.

Discharge line 46 carries supernatant fluid from settling tank 45 to aeration tank 47. The flowline 46 enters aeration tank 47 at inlet fitting 48. A blower 49 communicates via flowline 50 with aerator header 51. The header 51 provides multiple diffuser outlets 51A through which air can be pumped into the interior 52 of vessel 47. At the aeration tank 47, aeration and adjuration within the tank oxidizes any remaining waste and rejuvenates the laundered wash water through the use of the multiple aeration diffusers 51A that are a part of a header 51. From the adjuration and aeration tank 47 the laundered water is returned to the wash water storage facility 14 via flowlines 54, 55. In FIG. 1, the flow line 53 is a suction flowline for communicating with pump 54. The line 55 is a discharge line that communicates between pump 54 and storage facility 14.

Figure 4:
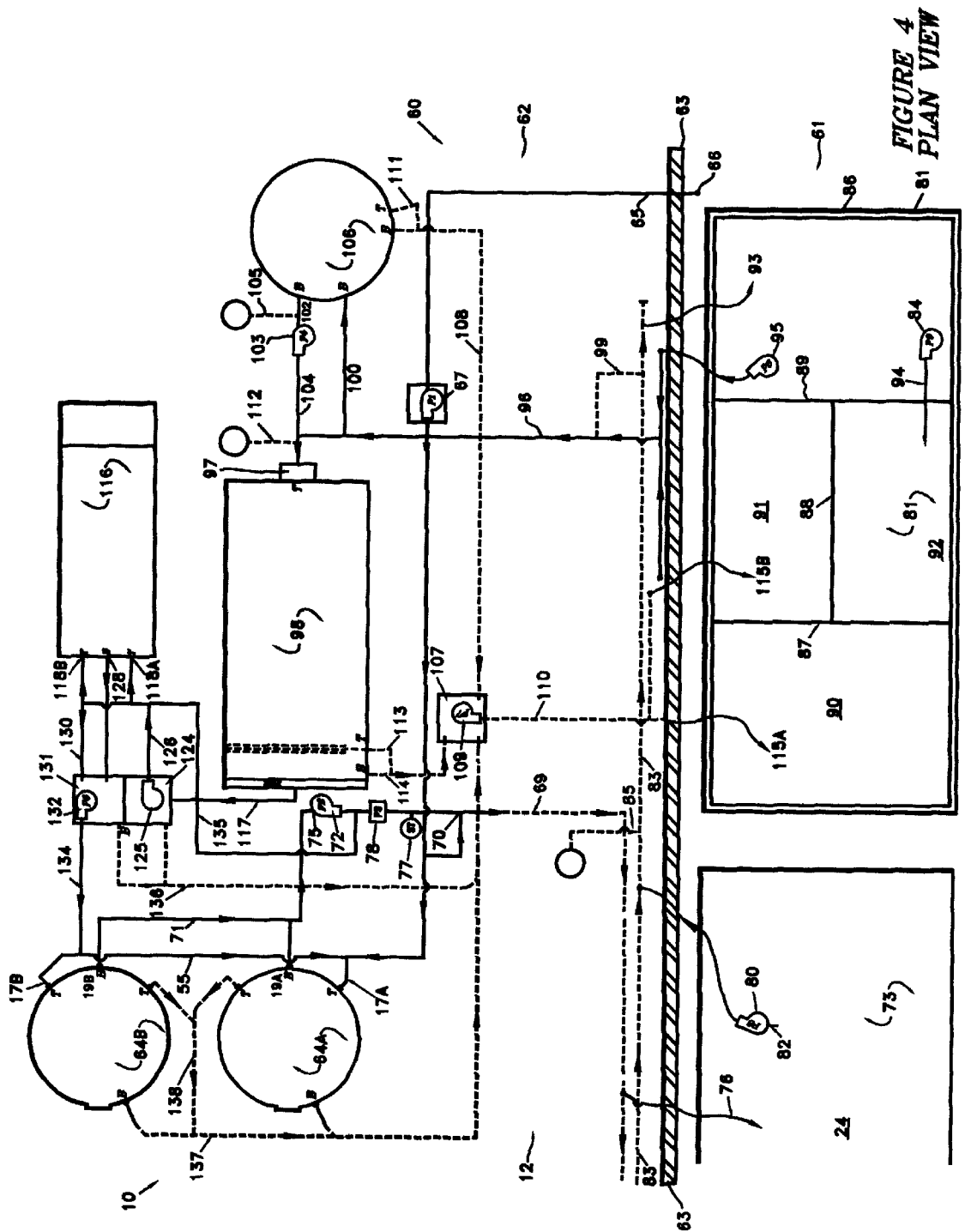
FIG. 4 is a plan view of a second embodiment of the apparatus of the present invention.

FIG. 4 illustrates in plan view a second embodiment of the apparatus of the present invention designated generally by the numeral 60. FIG. 4 also illustrates the method of the present invention that is used to treat wash water to be used to clean a vessel or a plurality of boats, barges, or like vessels. In FIG. 1, the body of water 61 is shown having a shoreline 63 separating the body of water 61 from land 62. In this environment, laundered wash water storage facility 64A, 64B can be located on land 62 adjacent to shoreline 63. Vessel 73 to be cleaned, can be positioned at the shoreline 63 or on land 12 and at close proximity to the laundered wash water storage facility 64A, 64B.

A raw water flowline 65 extends from the body of water 11 to the laundered wash water storage facility 14A, 14B. Raw water flowline 65 has an intake 66, a raw water pump 67, and a discharge 68. Raw water flowline 65 can be used to replenish the laundered wash water storage facility as needed to maintain a desired volume of water. The raw water flowline 65 can intake make up water to compensate for any water that remains in the receiving barge in the cleaning operation or to enhance the laundered wash water through dilution. It is also tied into the laundered water flowline 69 at 70 and through valving, enables some raw water to be used directly in vessel 73 cleaning.

A flowline 71 extends from laundered wash water storage facility 14A, 14B to the laundered wash water pump 72. The flowline 71 has an intake 74A, 74B and a pump suction 75. Pump 72 communicates with the vessel 73 to be cleaned using discharge line 76 which is equipped with a surge tank 77 and a pressure sensing switch 78 and which may be of pipe or flexible hose having a nozzle and/or other cleaning head for cleaning. The surge tank 77 and pressure switch sensing switch 78 allows for the intermittent operation of wash nozzles on the discharge hose line 76. Vessel 73 can carry drilling fluids or hazardous waste. In the oil and gas well drilling industry, the deck area of a vessel 73 is often contaminated with oil and gas well drilling fluids such as drilling mud or hazardous waste for example.

A pump 80 is used to transmit contaminated wash water from vessel 73 to receiving barge 81. Pump 80 has a suction line 82 for intaking water that has been contaminated. The pump 80 is connected to a discharge line 83 for transmitting contaminated water from pump 80 to section 93 of receiving barge 81. The water recovery and treatment process of the present invention begins with a collection of the wash water that is introduced into receiving barge using pump 80 and discharge line 83.

This contaminated wash water has been used on vessel 73 to clean and wash down any boat tanks, holds, bilges, barges, cutting boxes or containers, and any related waste contaminated portion of the vessel. The vessel 73 can be a boat, barge, work boat, crew boat, or the like. Such vessels are known in the art for transporting drilling products between shore and offshore oil and gas well drilling platforms and production platforms.

As the contaminated wash water accumulates in the vessel being cleaned, it is transferred using pump 80 via lines 82, 83 to a settlement compartment 93 of waste water receiving barge 81.

A primary coagulation cationic polymer is injected into the suction side of the waste water pump 80. However, the primary coagulation cationic polymer can be discharged to the downstream or discharge side of the waste water pump 80 if desired. In FIG. 4, arrow 85 designates an introduction of a primary coagulation cationic polymer in the basic process into the flowline 83 that is used to transmit contaminated water from vessel 73 to receiving barge 81.

The receiving barge 81 includes an outer vessel wall 86 and a plurality of inner walls 87–89. As shown in FIG. 4, the inner walls 87–89 divide the barge interior into a plurality of self-contained compartments 90–93. FIG. 4 shows compartment 93 as defining a primary settling zone or settlement section for removing solid material that is contained in the contaminated wash water transmitted from boat 73 to receiving barge 81 via flowline 83.

One of the advantages of the system of the present invention is that the receiving barge 81 continuously accumulates and concentrates solid waste material and floating waste material such as oil. With the method of the present invention, this is accomplished by continuously decanting only the uppermost water surface area of clean water contained in the receiving barge 81 and transmitting that decant water downstream for further treatment. Any oil or other floating waste is transmitted from section 93 of receiving barge 81 to one of the other section 90–93 using skimmer pump 84 and its discharge line 94. The remaining solid materials that is settled in settlement section 93 remains in that section 93 or can be transferred to one of the other sections 90–92, depending upon how much solid material has already been accumulated in the section 93.

Ideally, each of the sections 90–93 will be completely filled with solid or floating waste material using method of the present invention. The user continuously balances the amount of solid and flating waste material in each section 90–93 until the receiving barge is completely filled.

Oil skimmer 84 is used in the settlement section 93 of waste receiving barge 81 to collect any floating free product or emulsified oil that rises to the surface. These floating waste products are transferred to one of the waste concentration segments 90–93 of receiving barge 81.

The pump 95 preferably has a floating suction pickup that is placed at an approximate depth of about six to twelve inches (6"–12") into the uppermost decant zone of section 93. Supernatant water or decant water is removed from receiving barge 81 section 93 via pump 95 and influent flowline 96 to the agitation chamber 97 and settling tank 98.

At some waste transfer facility sites, dockage space may be limited to only one holding barge. At these locations, as an alternate arrangement, to the basic process, when holding barge 22 is full and is being changed out with an empty barge, it may be necessary to temporarily store contaminated wash water. On these occasions, by valving through flowline 99, 96 and 100, the contaminated wash water can be transferred to temporary storage tank 101. Temporarily stored contaminated wash water may be drawn off through flowline 102 by pump 103 and through flowline 104 and 96 and introduced into the agitation chamber 97 and settling tank 98. When an alternate arrangement is used, the primary coagulation cationic polymer is injected into the suction side of pump 103 at point 105.

When an alternate arrangement is used, some solids can be expected to settle into the temporary storage tank 106. These solids are transferred to the waste sump 107 through flowline 108 and returned to holding barge 81 by sump pump 109 through flowline 110. An overflow line 111 is connected to the tank drain 108.

In both the basic process and the alternate arrangement flowline 112 indicates a second point of chemical injection namely, the injection, of a cationic flocculent. A cationic flocculent is injected through flowline 112 into the influent flowline 96 which begins the secondary phase of the settling process.

Figure 5:
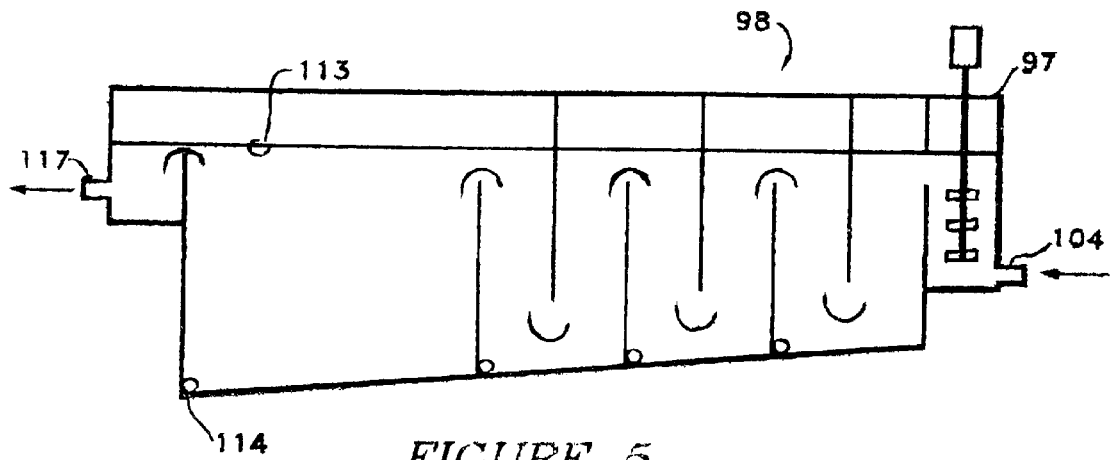
FIG. 5 is an elevational, fragmentary view of the second embodiment of the apparatus of the present invention illustrating the horizontal flow settling tank portion thereof.
Figure 6:
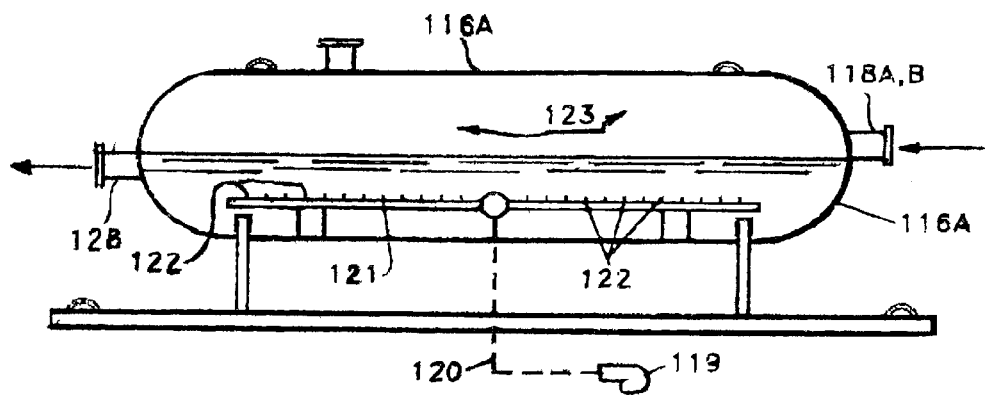
FIG. 6 is an elevational view illustrating the aeration tank portion of the second embodiment of the apparatus of the present invention.

Settling tank 98 may be either an incline plate (see FIG. 2) or a horizontal flow clarifier (see FIG. 5). A pair of discharge lines 113 and 114 allows for transporting floating and settleable solid waste material respectively from the settling tank 98 to waste sump 107. Within waste sump 107 is sump pump 109, which transports the waste material through flowline 110 to the barge sections 90–93. Line 113 can have more than one intake as shown in FIG. 5 wherein two intakes 113A–113B are shown. Flowline 110 can have multiple discharges 115A, 115B in order to distribute solid material or floating waste material to the desired section 115A, 115B, of receiving barge 81. Separator or clarifier apparatus such as 98 are commercially available for separating a waste water stream into the three components of settleable solids, floating solids and clarified water.

Figure 7:
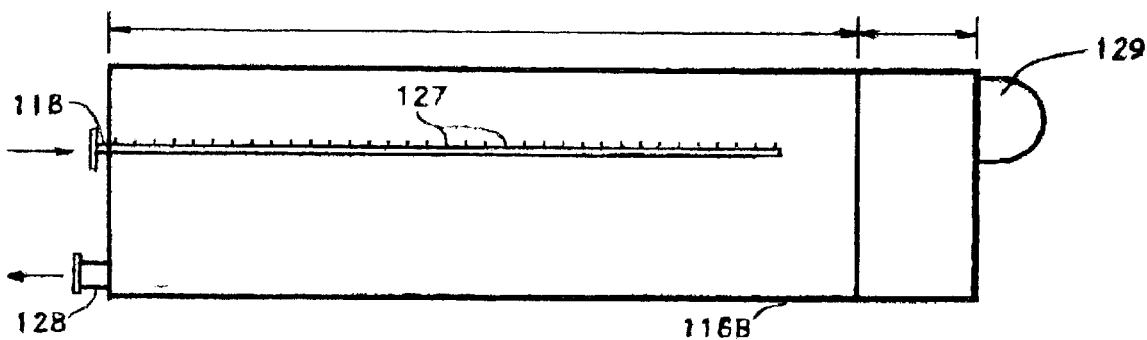
FIG. 7 is an elevational view of an alternate aeration tank for use with the second embodiment of the apparatus of the present invention.

An aeration tank 116 is included in the apparatus and may be either of two types, such as forced air or gravity flow. When a forced air aerator is used, discharge line 117 carries supernatant fluid from settling tank 98 to aeration tank 116 entering at inlet fittings 118A, 118B. The forced air aerator 116A (FIG. 7) has a blower 119 that communicates via flowline 120 with aerator header 121. The header 121 provides multiple diffuser outlets 122 through which air can be pumped into the interior 123 of vessel 116A. At the aeration tank 116A, aeration and adjuration within the tank oxidizes any remaining waste and rejuvenates the laundered wash water through the use of the multiple aeration diffusers 1222 that area part of a header 121.

When a gravity flow aerator is used, discharge line 117 carries supernatant fluid from settling tank 98 to the clarifier sump 124. Within the clarifier sump 124 is pump 125 which transports the supernatant fluid through flowline 126 to aeration tank 116B entering at inlet fittings 118A and 118B. Within the gravity flow aerator, the supernatant fluid is discharged through multiple diffuser outlets 127 and cascades by gravity to the bottom of the aerator, where it is collected and discharged through flowline 128. The cascading causes the aeration and adjuration within the tank that oxidizes any remaining waste and rejuvenates the laundered wash water. A blower 129 can be added to the gravity aerator to either increase air transfer or to provide evaporation. The gravity flow aerator can be by-passed completely by valving and directing the flow through flowline 130 into laundered sump 131.

From the aeration tank 116, the laundered water is returned to the laundered water storage facility 14 via flowline 128, laundered sump 131, laundered pump 132 and flow line 133. In FIG. 4, gravity flowline 128 communicates laundered sump 131 and laundered with pump 132. The line 134 is a discharge line that communicates between pump 132 and storage facility 64A, 64B.

26A polymer introduction 27A polymer introduction

Laundered wash water in the storage facility can be re-aerated by directing the wash water through flowline 71, pump 72, flowline 135 and inlets 118A and 118B to the aerator 116

Some solids can be expected to settle in the clarifier sump 124, the laundered sump 131 and the laundered wash water storage facility 14A, 14B. The solids from clarifier sump 124 and laundered sump 131 are transferred to waste sump 107 through flowline 136. The solids from laundered wash water storage facility 64A, 64B are transferred to waste sump 107 through tank drain flowline 137.

The laundered wash water storage facility 64A, 64B is provided with an overflow line 138 connected to the tank drain flowline 137.

The following table lists the parts numbers and parts descriptions as used herein and in the drawings attached hereto.

PARTS LIST

| Part Number | Description |
|---|---|
| 10 | wash water recovery system |
| 11 | body of water |
| 12 | land |
| 13 | shoreline |
| 14 | wash water storage facility |
| 15 | flowline |
| 16 | intake |
| 17 | discharge |
| 18 | flowline |
| 19 | intake |
| 20 | discharge |
| 21 | pumping station |
| 22 | discharge line |
| 23 | vessel |
| 24 | deck area |
| 25 | pump |
| 26 | suction line |
| 27 | flowline |
| 27A | polymer introduction |
| 28 | receiving barge |
| 29 | receiving barge outer wall |
| 30 | receiving barge inner wall |
| 31 | receiving barge inner wall |
| 32 | receiving barge inner wall |
| 33 | receiving barge compartment |
| 34 | receiving barge compartment |
| 35 | receiving barge compartment |
| 36 | receiving barge compartment |
| 37 | skimmer |
| 38 | flowline |
| 39 | pump |
| 40 | flowline |
| 41 | flowline |
| 42 | flowline |
| 42A | multiple discharge |
| 42B | multiple discharge |
| 43 | discharge line |
| 44 | discharge line |
| 45 | incline plate settling tank |
| 46 | flowline |
| 47 | aeration tank |
| 48 | inlet |
| 49 | blower |
| 50 | flowline |
| 51 | header |
| 51A | diffuser |
| 52 | interior |
| 53 | flowline |
| 54 | pump |
| 55 | flowline |
| 60 | wash water recovery system |
| 61 | body of water |
| 62 | land |
| 63 | shoreline |
| 64A | wash water storage |
| 64B | wash water storage |
| 65 | flowline |
| 66 | intake |
| 67 | pump |
| 68 | discharge |
| 69 | flowline |
| 70 | connection |
| 71 | flowline |
| 72 | pump |
| 73 | vessel |
| 74A | intake |
| 74B | intake |
| 75 | pump suction |
| 76 | discharge line |
| 77 | surge tank |
| 78 | switch |
| 79 | deck area |
| 80 | pump |
| 81 | receiving barge |
| 82 | suction |
| 83 | discharge line |

PARTS LIST

| Part Number | Description |
|---|---|
| 84 | skimmer pump |
| 85 | arrow |
| 86 | outer wall |
| 87 | inner wall |
| 88 | inner wall |
| 89 | inner wall |
| 90 | compartment |
| 91 | compartment |
| 92 | compartment |
| 93 | compartment |
| 94 | discharge line |
| 95 | pump |
| 96 | flowline |
| 97 | agitation chamber |
| 98 | settling tank |
| 99 | flowline |
| 100 | flowline |
| 101 | tank |
| 102 | flowline |
| 103 | pump |
| 104 | flowline |
| 105 | polymer injection point |
| 106 | tank |
| 107 | waste sump |
| 108 | flowline |
| 109 | pump |
| 110 | flowline |
| 111 | overflow line |
| 112 | flowline |
| 113 | discharge line |
| 113A | intake |
| 113B | intake |
| 114 | discharge line |
| 115A | discharge |
| 115B | discharge |
| 116 | aeration tank |
| 116A | forced air aeration |
| 116B | gravity flow aeration |
| 117 | line |
| 118A | inlet fitting |
| 118B | inlet fitting |
| 119 | blower |
| 120 | flowline |
| 121 | header |
| 122 | diffuser outlets |
| 123 | interior |
| 124 | sump |
| 125 | pump |
| 126 | flowline |
| 127 | diffuser outlets |
| 128 | flowline |
| 129 | blower |
| 130 | flowline |
| 131 | sump |
| 132 | pump |
| 133 | flowline |
| 134 | flowline |
| 135 | flowline |
| 136 | flowline |
| 137 | flowline |
| 138 | overflow line |

The foregoing embodiments are presented by way of example only; the scope of the present invention is to be limited only by the following claims.

I claim:

1. A method of cleaning vessels that have been contaminated with oil and gas well drilling fluids or hazardous waste comprising the steps of:

a) storing laundered wash water in a water storage facility that is in proximity to the vessel to be cleaned;

b) cleaning the vessel with wash water transmitted from the laundered wash water facility;

c) introducing a primary coagulation cationic polymer into the wash water in a flowline that extends between the vessel and a receiving barge that is in proximity to the vessel to be cleaned;

d) transmitting contaminated wash water from the vessel to be cleaned to the receiving barge;

e) settling and concentrating solid material within the receiving barge;

f) decanting supernatant wash water from the water surface area of water contained in the receiving barge after settling of solid material within the receiving barge;

g) introducing a cationic flocculent into the decant supernatant wash water in a flowline that extends between the receiving barge and a settling tank downstream of the receiving barge;

h) removing solid material from the wash water in the settling tank;

i) transmitting solid material from the settling tank to the receiving barge to further concentrate solid material within the receiving barge;

j) transmitting wash water from the settling tank to an aeration tank wherein the wash water is aerated to oxidize waste material contained within the wash water;

k) returning wash water that has been laundered in steps "b" through "j" from the aeration tank to the water storage facility; and l) using wash water returned in step "k" together with make up water to again clean a vessel that has been contaminated with oil and gas well drilling fluids or hazardous waste.

2. The method of claim 1 wherein step "d" comprises transmitting contaminated wash water from the vessel to the receiving barge wherein the receiving barge contains a plurality of separate holding tanks for separating fluid within the receiving barge.

3. The method of claim 1 wherein in step "f" decanting is accomplished by pumping.

4. The method of claim 1 wherein in step "d" the contaminated wash water is transmitted to a said receiving barge and wherein said receiving barge is provided with multiple barge sections and further comprising the step of transferring contaminated wash water from one said section to another of the said section receiving barge in order to selectively balance the solids that accumulate in each said section.

5. The method of claim 1 furthering comprising the step of removing fumes from the wash water after step "j".

6. The method of claim 5 wherein the removing of fumes includes the step of aerating the wash water.

7. A method of cleaning vessels that have been contaminated with oil and gas well drilling fluids or hazardous waste comprising the steps of:

a) storing laundered wash water in a water storage facility that is in proximity to the vessel to be cleaned;

b) cleaning the vessel with wash water transmitted from the laundered wash water facility to the vessel;

c) introducing a primary coagulation cationic polymer into the wash water in a flowline that extends between the vessel and a receiving barge that is in proximity to the vessel to be cleaned;

d) transmitting contaminated wash water from the vessel to be cleaned to a settling tank portion of the receiving barge;

e) decanting supernatant wash water from the water surface area of water contained in the receiving barge at the settling tank portion of the receive barge;

f) introducing a cationic flocculent into a flowline that contains a combination of the decant supernatant wash water in step "e" and contaminated wash water in step "d", said flowline extending between the receiving barge and a settling tank downstream of the receiving barge;

g) removing solid material from the wash water in the settling tank;

h) transmitting solid material from the settling tank to the receiving barge to further concentrate solid material within the receiving vessel;

i) transmitting wash water from the settling tank to an aeration tank wherein the wash water is aerated to oxidize waste material contained within the wash water;

j) returning wash water that has been laundered in steps "b" through "j" from the aeration tank to the water storage facility; and k) using wash water returned in step "k" together with make up water to again clean a vessel that has been contaminated with oil and gas well drilling fluids or hazardous waste.

8. The method of claim 7 wherein step "d" comprises transmitting at least some of the contaminated wash water from the vessel to the receiving vessel that contains a plurality of separate holding tanks for separating fluid within the vessel.

9. The method of claim 7 wherein in step "f" decanting is accomplished by pumping.

10. The method of claim 7 wherein in step "d" the contaminated wash water is transmitted to a barge with multiple tanks and further comprising the step of transferring contaminated wash water from one tank to another tank in order to selectively balance the solids that accumulate in each tank.

11. The method of claim 7 furthering comprising the step of removing fumes from the wash water after step "j".

12. The method of claim 11 wherein the removing of fumes includes the step of aerating the waste stream.

* * * * *